US012083367B2

(12) United States Patent
Tang et al.

(10) Patent No.: US 12,083,367 B2
(45) Date of Patent: Sep. 10, 2024

(54) HIGH TEMPERATURE-RESISTANT FIRE EXTINGUISHING ROBOT AND WORKING METHOD THEREFOR

(71) Applicant: BEIJING LESEN TECHNOLOGY CO., LTD, Beijing (CN)

(72) Inventors: Fei Tang, Beijing (CN); Yanlong Xu, Beijing (CN); Gang Luo, Beijing (CN); Jin Chen, Beijing (CN); Mingxu Li, Beijing (CN)

(73) Assignee: BEIJING LESEN TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/768,230

(22) PCT Filed: Mar. 17, 2021

(86) PCT No.: PCT/CN2021/081194
§ 371 (c)(1),
(2) Date: Apr. 12, 2022

(87) PCT Pub. No.: WO2021/190366
PCT Pub. Date: Sep. 30, 2021

(65) Prior Publication Data

US 2024/0108925 A1 Apr. 4, 2024

(30) Foreign Application Priority Data

Mar. 25, 2020 (CN) ......................... 202010218057.4

(51) Int. Cl.
*A62C 27/00* (2006.01)
*A62C 31/02* (2006.01)
*A62C 37/00* (2006.01)

(52) U.S. Cl.
CPC ............. *A62C 27/00* (2013.01); *A62C 31/02* (2013.01); *A62C 37/00* (2013.01)

(58) Field of Classification Search
CPC .......... A62C 27/00; A62C 31/02; A62C 37/00
(Continued)

(56) References Cited

U.S. PATENT DOCUMENTS

| | | | | |
|---|---|---|---|---|
| 4,678,041 A * | 7/1987 | Staudinger ............... | B60G 5/04 169/24 |
| 5,860,479 A * | 1/1999 | LaFollette ............. | A62C 27/00 169/24 |

(Continued)

FOREIGN PATENT DOCUMENTS

| | | |
|---|---|---|
| CN | 106267645 | 1/2017 |
| CN | 206762083 | 12/2017 |

(Continued)

*Primary Examiner* — Steven J Ganey
(74) *Attorney, Agent, or Firm* — SOROKER AGMON NORDMAN PTE LTD

(57) ABSTRACT

A high temperature-resistant fire extinguishing robot, comprising: a high temperature-resistant robot chassis system and a high temperature-resistant turret system. The high temperature-resistant robot chassis system carries the high temperature-resistant turret system to perform movements and obstacle avoidance, provides the high temperature-resistant turret system with energy, and further comprises: a high temperature-resistant tract drive system, a thermal protection system, and a control and sensor system, the high temperature-resistant track drive system being arranged outside of the thermal protection system, and the control and sensor system being arranged within the thermal protection system. The high-temperature turret system performs a fire extinguishing and cooling operation with respect to the external environment and further comprises: a water cannon, a water cannon thermal protection structure, and a cooling circulation system, the water cannon and the cooling circulation system being arranged within the water cannon thermal protection structure. In a high temperature-resistant protected state, the water cannon thermal protection struc- (Continued)

ture is closed; in a fire extinguishing work state, the water cannon thermal protection structure is opened, and the water canon perform a fire extinguishing operation.

13 Claims, 4 Drawing Sheets

(58) Field of Classification Search
USPC ...................... 169/24, 25, 43, 46, 47, 51, 52
See application file for complete search history.

(56) References Cited

U.S. PATENT DOCUMENTS

| | | | | |
|---|---|---|---|---|
| 7,975,621 | B2 * | 7/2011 | Gibson | B61D 5/00 169/62 |
| 8,973,671 | B2 * | 3/2015 | Alsaif | A62C 27/00 169/52 |
| 2009/0014186 | A1 * | 1/2009 | Collins | A62C 27/00 169/24 |

FOREIGN PATENT DOCUMENTS

| | | |
|---|---|---|
| CN | 208838947 | 5/2019 |
| CN | 209564546 | 11/2019 |
| CN | 110696013 | 1/2020 |
| CN | 111388920 | 7/2020 |
| KR | 100770655 | 10/2007 |
| KR | 20160139305 | 12/2016 |
| RU | 2682298 | 3/2019 |

* cited by examiner

HIGH TEMPERATURE-RESISTANT FIRE EXTINGUISHING ROBOT AND WORKING METHOD THEREFOR

TECHNICAL FIELD

The present invention relates to the technical field of fire-fighting robots, and particularly to a high temperature-resistant fire-fighting robot and a working method thereof.

BACKGROUND ART

As a tool to assist firemen to perform dangerous tasks, a fire-fighting robot should be brought to a fire site along with the firemen after the occurrence of a fire, and assist or replace the firemen to carry out operations such as information acquisition, fire-extinguishing, and personnel search and rescue on the fire site.

For the firemen's work, the most urgent and dangerous task is the personnel search and rescue and fire-extinguishing on the fire site. The persons trapped in the fire site have the highest safety risk, and should be found, rescued and transferred immediately. For most fire scenes, especially for fire scenes in large-span spaces, underground fires, petrochemical fires, etc., it is impossible to effectively extinguish the fire without going deep into the fire site.

The main functions of many existing fire-fighting robots are assistance works outside the fire site, such as extinguishing fire remotely or hauling water hoses. Owing to the existing robots cannot achieve the protection function to go deep into a fire site, it is difficult for those robots to provide substantial help to the firemen in the tasks such as acquiring on-site information, extinguishing fire sources and searching for and rescuing persons.

Although some relevant techniques have been applied in industrial applications for protection against high-temperature environments, it is necessary to cover the robots entirely with a thermal protection enclosure. Therefore, at present, it is difficult to provide reliable protection for the auxiliary transmission mechanisms used by existing high-mobility fire-fighting robots, such as the track chassis. At present, the thermal protection form for robots in the fire-fighting industry is mainly provided by self-spraying of water mist for cooling. Although that approach has certain cooling effect, it is difficult to use such a cooling theme to ensure that the robots will not be damaged at large-scale fire sites, where the ambient temperature is almost 1,000° C.

In addition, for robots intended for on-site operations, it is also necessary to properly protect the operating parts of the robots, such as the water cannons. However, since there is no high-temperature-resistant water cannon available on the market at present, no existing water cannon fire-fighting robot is capable of going deep into any fire site.

For the above reasons, at present, there is no fire-fighting robot on the market capable of going deep into a high-temperature fire site while working on the fire site.

Contents of the Invention

In order to overcome the drawbacks in the prior art, the purpose of the present invention is to provide a high-temperature-resistant fire-fighting robot, which can move and conduct extinguishing fire work in a high-temperature environment.

In order to attain the above object, the high-temperature-resistant fire-fighting robot provided by the present invention comprises a high-temperature-resistant robot chassis system and a high-temperature-resistant turret system, wherein, the high-temperature-resistant robot chassis system carrying the high-temperature-resistant turret system to move and surmount obstacles and providing energy to the high-temperature-resistant turret system, and further comprising a high-temperature-resistant track drive system, a thermal protection system and a control and sensing system, wherein the high-temperature-resistant track drive system is located outside the thermal protection system, and the control and sensing system is located inside the thermal protection system:

the high-temperature-resistant turret system performs fire-extinguishing and cooling operation for an external environment, and further comprises a water cannon, a thermal protection structure for the water cannon, and a cooling circulation system, wherein the water cannon and the cooling circulation system are located inside the thermal protection structure for the water cannon; the thermal protection structure for the water cannon is closed in a high temperature protection state:

the thermal protection structure for the water cannon is opened and the water cannon performs fire-extinguishing operation in a fire-extinguishing state.

Furthermore, the thermal protection structure for the water cannon comprises an open-close type protection door and a main protection enclosure for the turret.

Furthermore, the high-temperature-resistant turret system further comprises a water cannon camera or a thermal imager.

Furthermore, the thermal protection system comprises a thermal protection enclosure, a high-temperature-resistant electrical and refrigeration interface assembly, and a high-temperature-resistant hose interface assembly.

Furthermore, the high-temperature-resistant electrical and refrigeration interface assembly comprises a seal cap locker, a high-temperature-resistant sealing gasket, a heat-insulating panel, a power switch, a charging interface, a refrigeration interface, and a heat-insulating sealing cap.

Furthermore, the refrigeration interface comprises a coolant inlet and a coolant outlet.

Furthermore, the high-temperature-resistant hose interface assembly comprises a hose interface, a heat-insulating end cap, a high-temperature-resistant fiber braided tube and an end cap holder.

Furthermore, the high-temperature-resistant fire-fighting robot further comprises a cold source and a cooling circulation system for cooling the interior of the thermal protection enclosure.

Furthermore, the control and sensing system comprises a main control system, a communication system, a power management system, a high-temperature-resistant camera system, a high-temperature-resistant lighting assembly, and a high-temperature-resistant antenna.

Furthermore, partial structures of the high-temperature-resistant camera system, the high-temperature-resistant lighting assembly and the high-temperature-resistant antenna penetrate through the thermal protection enclosure for acquiring information and transmitting information to the external environment.

Furthermore, the high-temperature-resistant fire-fighting robot further comprises a radar assembly and an optical sensor assembly on the chassis.

In order to attain the above object, the present invention further provides a working method of a high-temperature-resistant fire-fighting robot, comprising the following steps:

1) closing an open-close type protection door of a thermal protection structure for a water cannon, a heat-insulating sealing cap at an electrical interface, and a heat-insulating end cap of a high-temperature-resistant hose interface assembly, to enter into a high-temperature protection state:

2) the high-temperature-resistant fire-fighting robot entering or passing through a high-temperature fire site for performing exploration and reconnaissance work in the high-temperature protection state;

3) opening the heat-insulating end cap to connect a hose, opening the open-close type protection door, and starting water spraying from a water cannon when the high-temperature-resistant fire-fighting robot reaches a designated operation area, thus switching the high-temperature-resistant fire-fighting robot from the high-temperature protection state to the fire-extinguishing state:

4) removing the hose, closing the heat-insulating end cap and the open-close type protection door after the fire-extinguishing operation is completed, thus switching the high-temperature-resistant fire-fighting robot from the fire-extinguishing state to the high-temperature protection state.

Furthermore, the method further comprises a step of regulating the temperature of the cold source to a predetermined temperature before the thermal protection structure for the water cannon is closed in the step 1): refrigerating the cold source by means of an external cooling system, replacing a coolant of the cold source, or replacing the cold source; cutting off the external cooling system when the temperature of the cold source reaches the predetermined temperature.

Furthermore, after the fire-extinguishing operation is completed, the high-temperature-resistant fire-fighting robot is switched to the high-temperature protection state and exits the fire site.

The high-temperature-resistant fire-fighting robot and the working method thereof in the present invention attain the following beneficial effects:

1) The entire chassis of the robot and the water cannon are treated systematically for thermal protection, thus the robot is capable of moving and performing fire-extinguishing work for a long time in the high-temperature environment;

2) The problems that the existing robots have low fire-extinguishing efficiency because they can't enter deep into a fire site owing to inadequate thermal protection and the existing robots may be damaged in a sudden high-temperature ambient environment are solved, and the fire-extinguishing efficiency and reliability of the robots are greatly improved;

3) By designing the fire-fighting robot with combined high-temperature-resistant turret and high-temperature-resistant chassis, the problem of thermal protection for the water cannon and the chassis is broken down and solved respectively; thus the technical difficulties in solving the thermal protection problem as a whole are reduced, and water cannons with different performances and specifications can be matched and integrated with power chassis as required.

Other features and advantages of the present invention will be detailed in the following description, and will become apparent partially from the description, or be understood through implementation of the present invention.

DESCRIPTION OF DRAWINGS

The accompanying drawings are provided for further understanding of the present invention, and constitute a part of the specification. These drawings are used in conjunction with the embodiments of the present invention to interpret the present invention, but don't constitute any limitation to the present invention. In the figures.

EMBODIMENTS

Hereunder some preferred embodiments of the present invention will be described with reference to the accompanying drawings. It should be understood that the preferred embodiments described herein are only intended to describe and explain the present invention, but don't constitute any limitation to the present invention.

Figure 1:
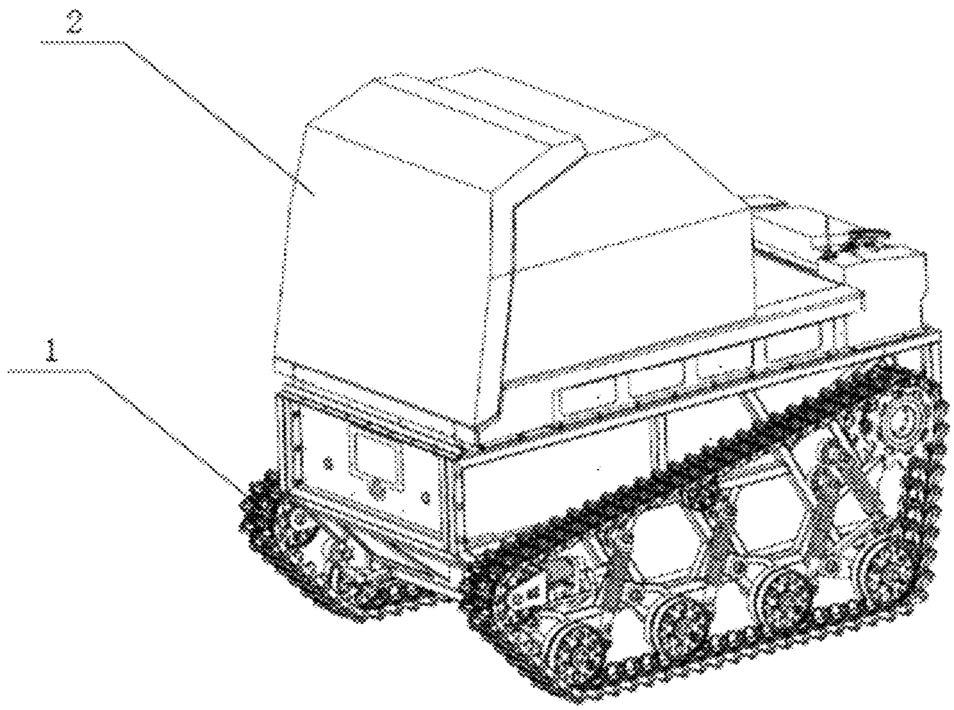
FIG. 1 is a side view of the high-temperature-resistant fire-fighting robot according to the present invention.

FIG. 1 is a side view of the high-temperature-resistant fire-fighting robot according to the present invention. As shown in FIG. 1, the high-temperature-resistant fire-fighting robot in the present invention comprises a high-temperature-resistant robot chassis system 1 and a high-temperature-resistant turret system 2, wherein, the high-temperature-resistant robot chassis system 1 is configured to carry the high-temperature-resistant turret system 2 to move and surmount obstacles, carry some sensing devices, and serve as a main body to provide energy and working medium such as coolant, electric power and fire water, etc. to the high-temperature-resistant turret system. The high-temperature-resistant robot chassis system 1 in the present invention comprises a high-temperature-resistant track drive system, a thermal protection system, and a control and sensing system, wherein, the high-temperature-resistant track drive system is configured to carry the robot to move and surmount obstacles. The high-temperature-resistant track drive system mainly comprises high-temperature-resistant tracks 101, high-temperature-resistant driving wheels 102, a high-temperature-resistant suspension system 103, a high-temperature-resistant and heat-insulating transmission system, a geared motor 508, a battery 507 and a driver.

Specifically, the high-temperature-resistant and heat-insulating transmission system mainly comprises a rigid shaft for transmission and a heat-insulating layer outside the rigid shaft.

Specifically, the driver is a servo driver, used as a controller for controlling one or more parameters of motor position, speed and torque.

The thermal protection system is configured to protect the robot to perform fire-extinguishing operation in a high-temperature environment. The thermal protection system mainly comprises a thermal protection enclosure 302, a high-temperature-resistant electrical and refrigeration interface assembly 301 and a high-temperature-resistant hose interface assembly 303.

Specifically, the thermal protection system further comprises a cold source 503 and a cooling circulation system 504 for cooling the interior of the thermal protection enclosure 302 (the main body of the cold source is a coolant, which is initially at a low temperature, and absorbs heat through temperature rise, phase change or a combination of them).

The control and sensing system comprises a main control system 505, a power management system 506, a communication system 501, a high-temperature-resistant camera system 403, a high-temperature-resistant lighting assembly 402, and a high-temperature-resistant antenna 404, etc.

Specifically, the high-temperature-resistant camera system 403 comprises a camera, a high-temperature-resistant lens, and a lens cooling device.

Figure 3:
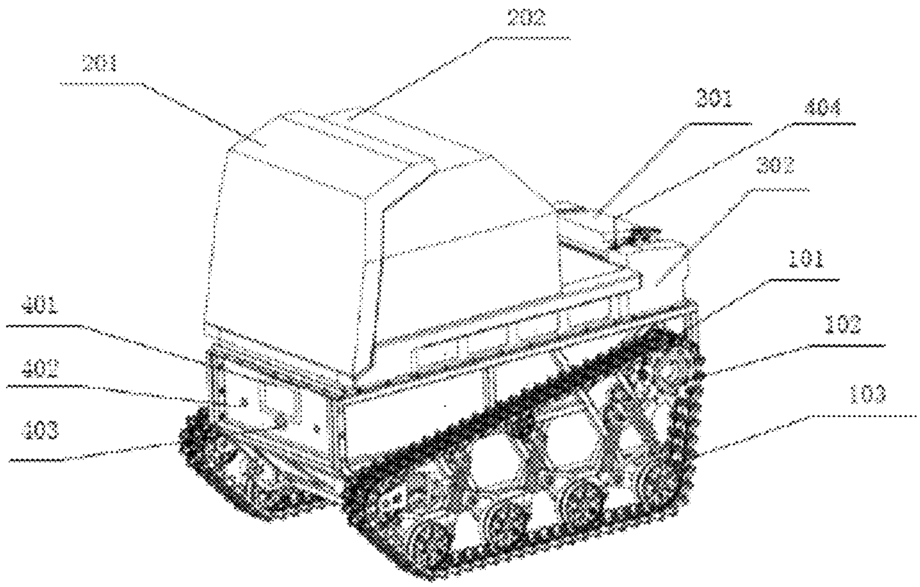
FIG. 3 is a schematic structural diagram of the high-temperature-resistant firefighting robot in a high-temperature protection state according to the present invention.

FIG. 3 is a schematic structural diagram of the high-temperature-resistant fire-fighting robot in the present invention in the high-temperature protection state. As shown in FIG. 3, the high-temperature-resistant tracks 101 and the high-temperature-resistant driving wheels 102, and the high-temperature-resistant suspension system 103, which have a high-temperature-resistant property in part or in their entirety, are located outside the thermal protection enclosure 302, while partial structures of the high-temperature-resistant camera system, the high-temperature-resistant lighting system 402 and the high-temperature-resistant antenna 404 penetrate through the thermal protection enclosure 302 for acquiring information and transmitting information or capabilities to the external environment. The rest components and the control and sensing system are located inside the thermal protection enclosure 302, so that they are properly protected in a high-temperature environment.

Specifically, the control and sensing system further comprises a radar assembly 401 and a high-temperature-resistant camera system 403.

Specifically, the radar assembly 401 can be a millimeter-wave radar, which is configured to detect the positions and distances of obstacles around the robot, so as to provide ambient information for obstacle avoidance and navigation of the robot.

Figure 5:
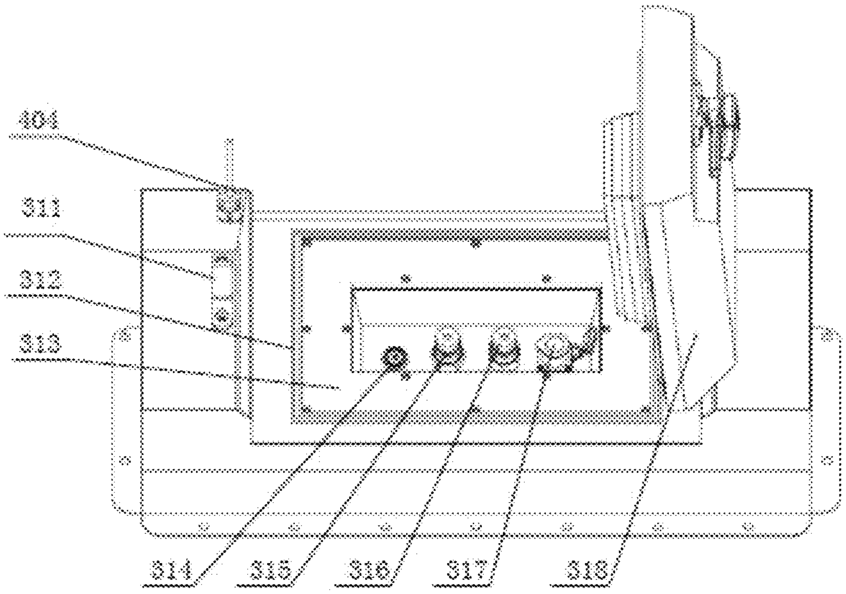
FIG. 5 is a schematic diagram of a high-temperature-resistant electrical and refrigeration interface assembly according to the present invention.

FIG. 5 is a schematic diagram of the high-temperature-resistant electrical and refrigeration interface assembly according to the present invention. As shown in FIG. 5, the high-temperature-resistant electrical and refrigeration interface assembly 301 comprises one or more of a sealing cap locker 311, a high-temperature-resistant sealing gasket 312, a heat-insulating panel 313, a power switch 314, a charging interface 317 and a refrigeration interface. A fixed shaft flip-type or rotary opening-type heat-insulating sealing cap 318 is provided at the electrical interface. The sealing cap 318 ensures the thermal protection performance when it is closed at high temperature, and the sealing cap can be opened so that the interface can be operated in a non-high-temperature state.

Preferably, the robot further comprises an emergency stop switch not shown in the figures, which is configured to stop the robot quickly, and has the same function as the emergency stop switch found in conventional production equipment.

Preferably, the robot further comprises a battery status display not shown in the figures, which is configured to displaying the remaining capacity of the battery, and the battery status display may be an LCD or multi-color LED display. The display mode can be percentage direct display, ladder display or indicator warning for low battery.

Preferably, the refrigeration interface comprises a coolant inlet 315 and a coolant outlet 316.

Figure 6:
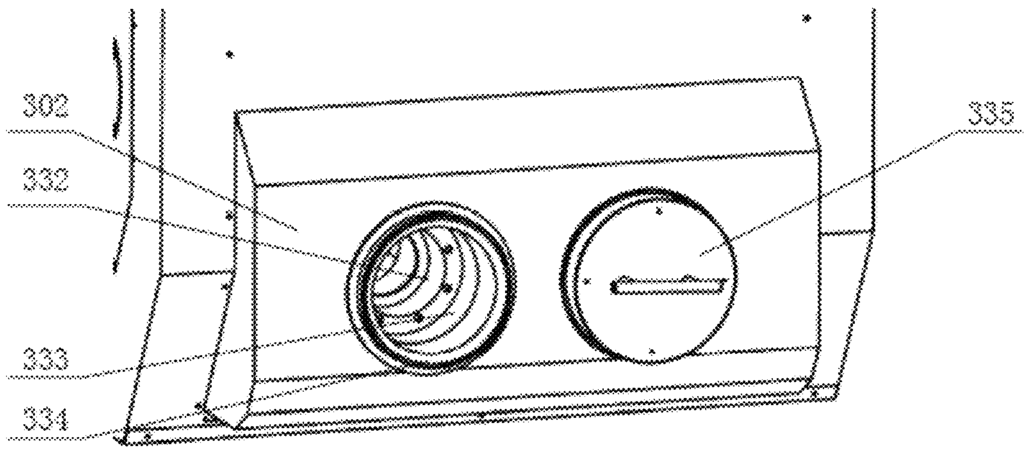
FIG. 6 is a schematic diagram of the high-temperature-resistant hose interface assembly according to the present invention.

FIG. 6 is a schematic diagram of the high-temperature-resistant hose interface assembly according to the present invention. As shown in FIG. 6, the high-temperature-resistant hose interface assembly 303 comprises a hose interface 332 and a heat-insulating end cap 335. The heat-insulating end cap 335 is configured to protect the hose interface 332 from being damaged by high temperature before used, and can be opened automatically or removed by external force before a hose is connected.

Specifically, the high-temperature-resistant hose interface assembly further comprises a high-temperature-resistant fiber braided tube 333 and an end cap holder 334.

Figure 7:
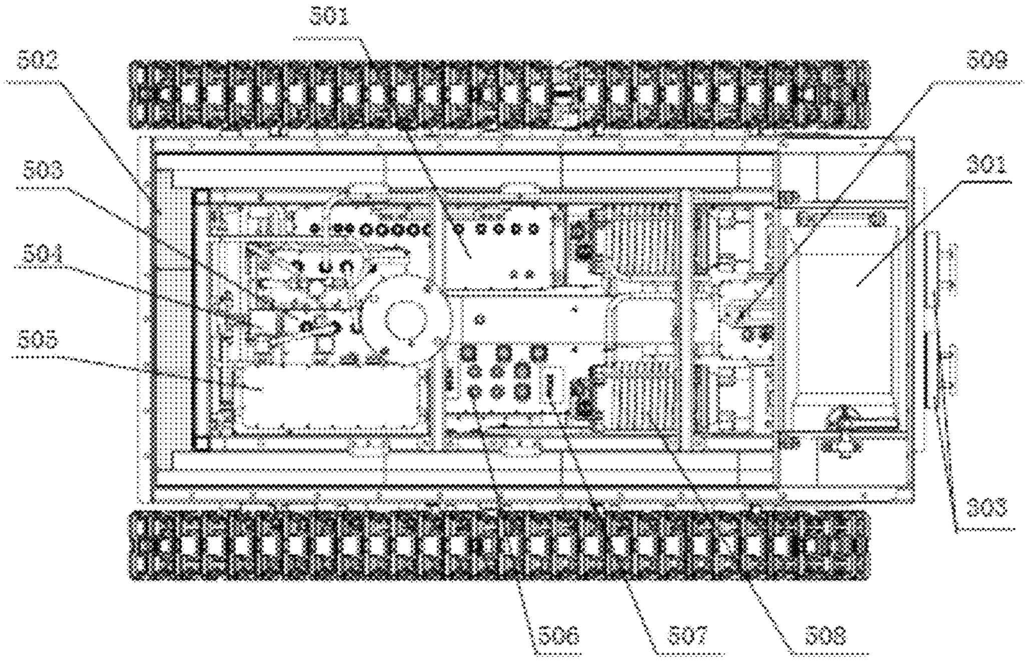
FIG. 7 is a schematic diagram of the internal systems of the high-temperature-resistant fire-fighting robot (with the turret and the top cover removed) according to the present invention.

FIG. 7 is a schematic diagram of the internal systems of the high-temperature-resistant fire-fighting robot (with the turret and the top cover removed) according to the present invention. As shown in FIG. 7, the robot further comprises a thermal protection layer 502 for isolating the external high-temperature to protect the internal systems from being damaged.

The high-temperature-resistant turret system 2 comprises a thermal protection structure for water cannon, a cooling circulation system 504, a water cannon 203, and a spraying system, etc., and is configured to protect the water cannon system and perform fire extinguishing operation by spraying water.

Specifically, the spraying system comprises a sprinkler, a pipeline for connecting the sprinkler and a water supply system for the water cannon, and a valve for controlling the on-off of the pipeline.

Figure 2:
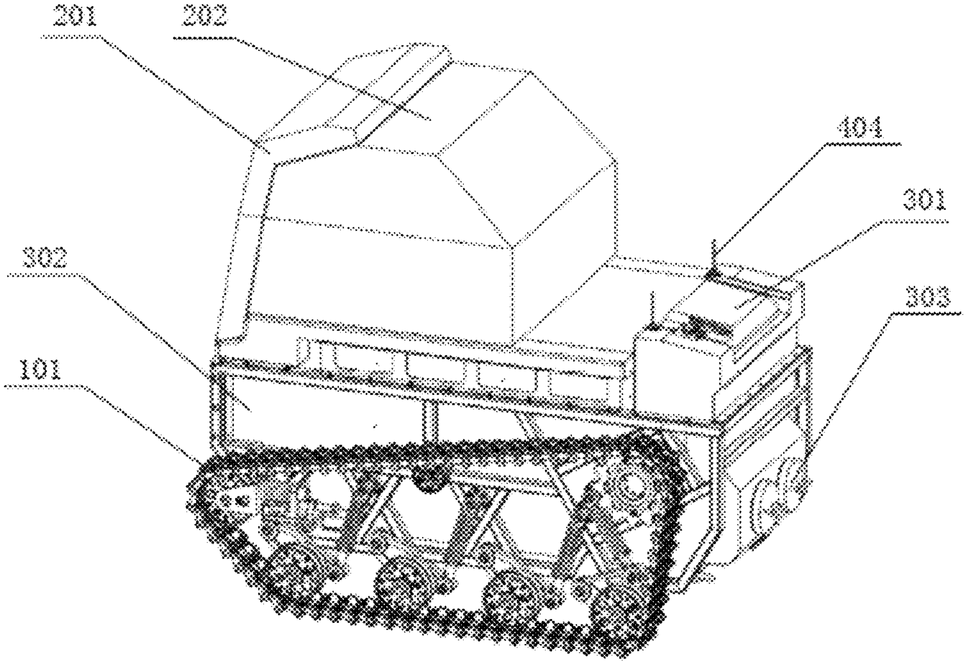
FIG. 2 is a schematic diagram of the components of the high-temperature-resistant fire-fighting robot according to the present invention.

FIG. 2 is a schematic diagram of the components of the high-temperature-resistant fire-fighting robot according to the present invention. As shown in FIG. 2, the thermal protection structure for the water cannon of the high-temperature-resistant turret system 2 comprises an open-close type protection door 201 and a main protection enclosure 202 for the turret.

Figure 4:
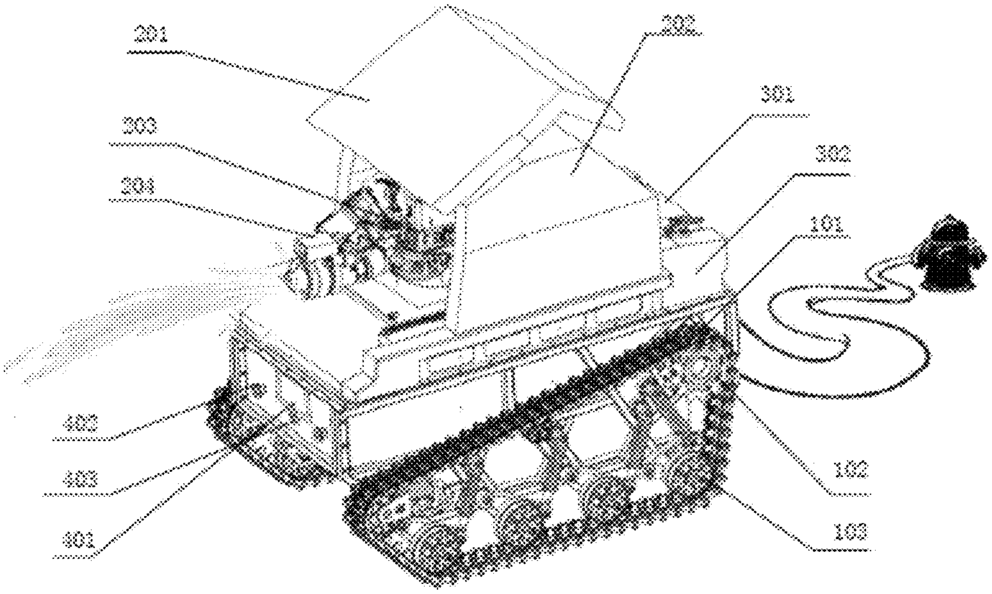
FIG. 4 is a schematic structural diagram of the high-temperature-resistant firefighting robot in a fire-extinguishing state according to the present invention.

FIG. 4 is a schematic structural diagram of the high-temperature-resistant fire-fighting robot according to the present invention in the fire-extinguishing state. As shown in FIG. 4, the high-temperature-resistant turret system 2 further comprises a water cannon camera or a thermal imager 204.

Preferably, the thermal protection structure for the water cannon of the high-temperature-resistant turret system 2 has an open-close type or dynamic protection structure matching the movement range of the water cannon 203, which is configured to adjust the spraying angle and position of the water cannon 203 in a wide range in the working process.

Both the high-temperature-resistant robot chassis system 1 and the high-temperature-resistant turret system 2 have a thermal protection structure and a cooling system to protect the fire-fighting robot from being damaged or affected by the high temperature during travel or operation in a high-temperature environment.

In the high-temperature protection state, the high-temperature-resistant robot chassis system 1 and the high-temperature-resistant turret system 2 should jointly or respectively ensure good thermal sealing performance to prevent a large amount of external heat from being transferred into the thermal protection enclosure and damaging the internal components.

By designing the fire-fighting robot with combined high-temperature-resistant turret and high-temperature-resistant chassis, the problem of thermal protection for the water cannon and the chassis is broken down and solved respectively; thus the technical difficulties in solving the thermal protection problem as a whole are reduced, and water cannons with different performances and specifications can be matched and integrated with power chassis as required.

The fire-fighting robot needs to employ different working flows, according to the different protection form of the turret and the interface. Taking the open-close type turret as an example, the fire-fighting robot will have two different structural states: a high-temperature protection state and a fire-extinguishing state.

In the high-temperature protection state, the turret is closed, the external interfaces such as the hose and the switch are closed, and the entire robot has a higher thermal protection performance. In that state, it is necessary to ensure that the chassis and some sensors and electronic control systems used to control the traveling of the robot work normally. The robot moves to a designated working location in this state.

In the fire-extinguishing state, the thermal protection enclosure of the water hose interface is opened or removed, a water hose is connected, and the water cannon is capable of spraying water. Then, the thermal protection enclosure that blocks the movement and spraying range of the water cannon is moved away or removed, and the water cannon starts to work. In this state, the robot is cooled not only by its own internal cooling system but also by the water mist sprayed from the water cannon and the sprinkler.

After the fire-extinguishing work of the fire-fighting robot is completed, if the ambient temperature is still high or the robot has to pass through a high-temperature area in the exiting process, the water cannon and the turret can be reset. The robot can be switched to the high-temperature protection state to safely exit the fire site.

Hereunder the high-temperature-resistant fire-fighting robot and the working method thereof in the present invention will be further described in a specific embodiment. Taking an open-close type turret as an example, the working flow of the high-temperature-resistant fire-fighting robot is as follows:

1. The coolant of the cold source is refrigerated by an external cooling system, or the coolant of the cold source or the cold source can be directly replaced, to regulate the temperature of the cold source to a predetermined temperature:
2. The external cooling system is cut off after the predetermined temperature is reached;
3. Each sealing and heat-insulating interface on the robot (including the open-close type protection door 201, the heat-insulating sealing cap 318 and the heat-insulating end cap 335 in this embodiment) are closed, and the robot is switched to the high-temperature protection state:
4. The robot enters into or passes through a high-temperature fire site for exploration and reconnaissance in the high-temperature protection state;
5. The thermal protection structure of the hose interface (the heat-insulating end cap 335 in this embodiment) is opened and a hose is connected after the robot reaches a designated operation area. The cooling water conveyed in the hose keeps the hose and the hose interface at a low temperature and working continuously.
6. The thermal protection structure of the water cannon (the open-close type protection door 201 in this embodiment) is opened, and the water cannon starts to spray water. The interior of the turret and the robot body can be cooled continuously by auxiliary nozzles.
7. After completing the operation, the sealing and heat-insulating interfaces of the robot are closed, the robot passes through the high temperature area again or leaves directly from the non-high-temperature area after the fire-extinguishing and cooling operation is completed.

Those skilled in the art can understand: the embodiments described above are only some preferred embodiments of the present invention, and should not be deemed as constituting any limitation to the present invention. Although the present invention is described and illustrated above in detail with respect to the embodiments, those skilled in the art can easily make modifications to the technical solutions described in the above embodiments or make equivalent replacements of some technical features. Any modification, equivalent replacement, or improvement made within the spirit and the principle of the present invention should be included in the scope of protection of the present invention.

The invention claimed is:

1. A high-temperature-resistant fire-fighting robot, comprising a high-temperature-resistant robot chassis system and a high-temperature-resistant turret system, wherein, the high-temperature-resistant robot chassis system carrying the high-temperature-resistant turret system to move and surmount obstacles and providing energy to the high-temperature-resistant turret system, and further comprises a high-temperature-resistant track drive system, a thermal protection system and a control and sensing system, wherein the high-temperature-resistant track drive system is located outside the thermal protection system, and the control and sensing system is located inside the thermal protection system:

the high-temperature-resistant turret system performs fire-extinguishing and cooling operation for an external environment, and further comprises a water cannon, a thermal protection structure for the water cannon, and a cooling circulation system, wherein the water cannon and the cooling circulation system are located inside the thermal protection structure for the water cannon;

the thermal protection structure for the water cannon is closed in a high temperature protection state;

the thermal protection structure for the water cannon is opened and the water cannon performs fire-extinguishing operation in a fire-extinguishing state.

2. The robot system according to claim 1, wherein the thermal protection structure for the water cannon comprises an open-close type protection door and a main protection enclosure for the turret.

3. The robot system according to claim 1, wherein the high-temperature-resistant turret system further comprises a water cannon camera or a thermal imager.

4. The robot system according to claim 1, wherein the thermal protection system comprises a thermal protection enclosure, a high-temperature-resistant electrical and refrigeration interface assembly, and a high-temperature-resistant hose interface assembly.

5. The robot system according to claim 4, wherein the high-temperature-resistant electrical and refrigeration interface assembly comprises a sealing cap locker, a high-temperature-resistant sealing gasket, a heat-insulating panel, a power switch, a charging interface, a refrigeration interface, and a heat-insulating sealing cap.

6. The robot system according to claim 5, wherein the refrigeration interface comprises a coolant inlet and a coolant outlet.

7. The robot system according to claim 4, wherein the high-temperature-resistant hose interface assembly comprises a hose interface, a heat-insulating end cap, a high-temperature-resistant fiber braided tube and an end cap holder.

8. The robot system according to claim 4, further comprising a cold source and a cooling circulation system for cooling the interior of the thermal protection enclosure.

9. The robot system according to claim 1, wherein the control and sensing system comprises a main control system, a communication system, a power management system, a high-temperature-resistant camera system, a high-temperature-resistant lighting assembly, and a high-temperature-resistant antenna.

10. The robot system according to claim 9, wherein the partial structures of the high-temperature-resistant camera system, the high-temperature-resistant lighting assembly and the high-temperature-resistant antenna penetrate through the thermal protection enclosure for acquiring information and transmitting information to the external environment.

11. The robot system according to claim 9, further comprising a radar assembly and an optical sensor assembly on the chassis.

12. A working method of a high-temperature-resistant fire-fighting robot, comprising the following steps:

1) closing an open-close type protection door of a thermal protection structure for a water cannon, a heat-insulating sealing cap at an electrical interface, and a heat-insulating end cap of a high-temperature-resistant hose interface assembly, to enter into a high-temperature protection state;

2) the high-temperature-resistant robot entering or passing through a high-temperature fire site for exploration and reconnaissance in the high-temperature protection state;

3) opening the heat-insulating end cap to connect a hose, opening the open-close type protection door, and starting water spraying from a water cannon when the high-temperature-resistant fire-fighting robot reaches a designated operation area, thus switching the high-temperature-resistant fire-fighting robot from the high-temperature protection state to a fire-extinguishing state;

4) removing the hose, closing the heat-insulating end cap and the open-close type protection door after the fire-extinguishing operation is completed, thus switching the high-temperature-resistant fire-fighting robot from the fire-extinguishing state to the high-temperature protection state.

13. The method according to claim 12, further comprising a step of regulating the temperature of a cold source to a predetermined temperature before the step 1): refrigerating the cold source by means of an external cooling system, replacing a coolant of the cold source, or replacing the cold source; cutting off the external cooling system when the temperature of the cold source reaches the predetermined temperature.

* * * * *